Patented Aug. 3, 1937

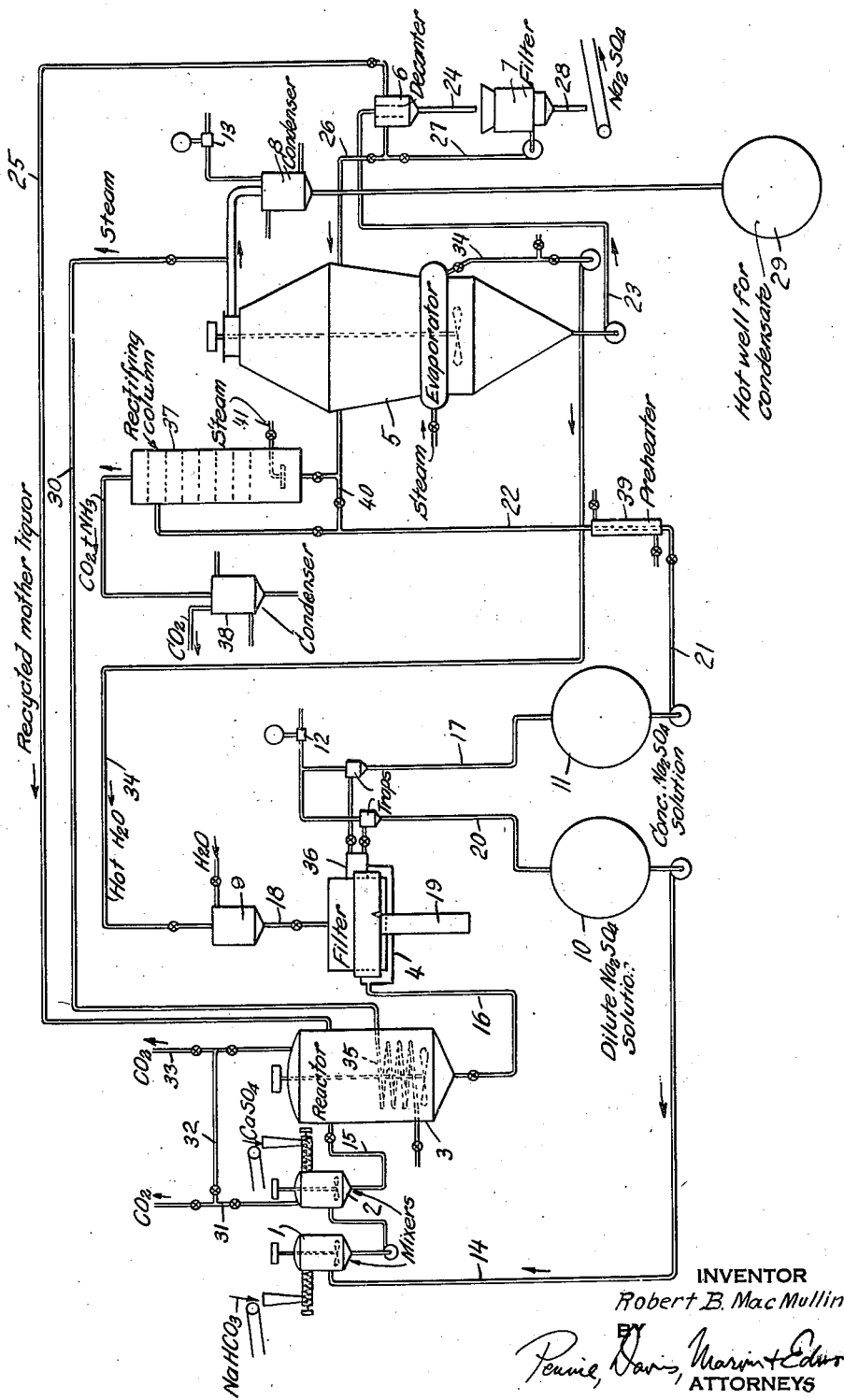

2,089,130

UNITED STATES PATENT OFFICE 2,089,130

MANUFACTURE OF SODIUM SULPHATE

Robert Burns MacMullin, Niagara Falls, N. Y., assignor to The Mathieson Alkali Works, Inc., New York, N. Y., a corporation of Virginia Application October 17, 1934, Serial No. 748,607

2 Claims. (Cl. 23—121)

This invention relates to improvements in the manufacture of sodium sulphate, and particularly anhydrous sodium sulphate, from sodium bicarbonate and calcium sulphate. Sodium bicarbonate and calcium sulphate react, in aqueous media, to form sodium sulphate with precipitation of calcium carbonate and liberation of carbon dioxide. The reaction may be typified as follows:

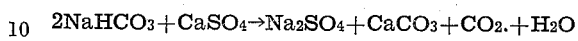
$$2NaHCO_3 + CaSO_4 \rightarrow Na_2SO_4 + CaCO_3 + CO_2 + H_2O$$

Following separation of the precipitated calcium carbonate, the sodium sulphate can be recovered from the resultant liquor, as anhydrous sodium sulphate for example by evaporation at temperatures upwards of 33° C. This invention relates, more particularly, to an improved cyclic operation for carrying out this reaction.

In carrying out this invention, sodium bicarbonate, in the form of crude ammonia soda, and calcium sulphate are introduced into a reaction vessel, in an aqueous reaction medium, in which the reaction forming sodium sulphate is completed. The liberated carbon dioxide and the liquor including dissolved sodium sulphate and suspended calcium carbonate are separately discharged from the reaction vessel. Calcium carbonate is separated from this liquor, by filtration, for example. Following separation of the calcium carbonate, the liquor is concentrated, by evaporation, for example, to precipitate sodium sulphate which is then separated from the concentrated liquor.

In this operation, in accordance with this invention, the calcium carbonate as initially separated from the liquor discharged from the reaction vessel is washed with sufficient water to form, as wash liquor, the aqueous medium in which the sodium bicarbonate and calcium sulphate are supplied to the reaction vessel, and the concentrated liquor, following separation of precipitated sodium sulphate, is returned to the reaction vessel. Important economies are thus secured.

In this connection it should be noted that the reaction between calcium sulphate and sodium bicarbonate approaches but never quite reaches equilibrium and accordingly the reaction liquor will contain some sodium carbonate. Upon evaporation sodium sulphate will first precipitate, the sodium carbonate and other soluble impurities in the crude ammonia soda, such as sodium chloride, for example, concentrating in the mother liquor. Complete evaporation of the mother liquor should be avoided as if too much of the mother liquor is evaporated, impurities will precipitate and contaminate the product, sodium sulphate. This invention includes as a feature the return of all or part of the mother liquor, at that stage of concentration at which sodium carbonate just begins to precipitate in the form of Burkeite, $2Na_2SO_4 \cdot Na_2CO_3$, to the reaction vessel. Sodium carbonate present in the mother liquor returned to the reaction vessel is then converted to sodium sulphate. The reaction may be typified as follows:

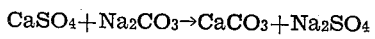
$$CaSO_4 + Na_2CO_3 \rightarrow CaCO_3 + Na_2SO_4$$

Crude ammonia soda, as ordinarily formed, contains NaCl, $Na_2SO_4$, $Na_2CO_3$, $NH_4HCO_3$, $CaCO_3$, $MgCO_3$ and $SiO_2$ as impurities. Of these impurities, sodium chloride is the only one which collects and eventually has to be removed either with the $Na_2SO_4$ produced or by purging the system of a small quantity of the mother liquor remaining after separation of the $Na_2SO_4$ produced. The sodium sulphate is a useful impurity. $Na_2CO_3$ present as an impurity, is converted into $Na_2SO_4$. $NH_4HCO_3$ present is decomposed in the reaction vessel yielding $NH_3 + CO_2$, both of which gases are recoverable either from the reaction vessel or from the vapors from the evaporator. The remaining impurities $CaCO_3$, $MgCO_3$ and $SiO_2$ are insoluble and are removed along with the $CaCO_3$ produced by the reaction by filtration, for example. It will be apparent that when the invention is practiced using pure sodium bicarbonate in place of crude ammonia soda, difficulties ordinarily encountered because of the presence of impurities are eliminated and all the mother liquor remaining after separation of the sodium sulphate formed may be returned to the reaction vessel without accumulation and eventual contamination of the sodium sulphate product with sodium chloride.

The amount of mother liquor returned to the reaction vessel will depend largely on the condition of evaporation, i. e., the temperature and pressure employed, which determine the solubility of $Na_2CO_3$ in the mother liquor. In general, the higher the temperature, the lower the solubility of $Na_2CO_3$ in the $Na_2SO_4$ solution, and the greater the proportion of mother liquor to evaporator feed, returned to the reaction vessel.

The invention will be further described in connection with the accompanying drawing which illustrates, schematically and conventionally, and somewhat as a flow sheet, an arrangement of apparatus adapted for carrying out the invention.

Referring to the accompanying drawing, the apparatus illustrated comprises mixers 1 and 2, a reaction vessel 3, a filter 4, an evaporator 5, a separator 6, a centrifuge 7, a condensing column 8, storage vessels 9, 10 and 11, and vacuum pumps 12 and 13. Two or more reaction vessels in which the reaction is progressively completed may be substituted for the single reaction vessel 3 illustrated. The filter 4, for example, may be of conventional continuous rotary type, the discharge connections 17 and 20, connecting with a conventional automatic valve 36. Two, three or more filters may be operated in parallel in the place of the filter 4, illustrated. The evaporator 5 illustrated may comprise two or more multiple effect evaporators with parallel flow of the sodium sulphate liquor therethrough or it may comprise a series of multiple effect evaporators through which the sodium sulphate liquor passes in succession, and in the latter case the most concentrated liquor may be subjected to the highest temperature with separation of precipitated sodium sulphate, as in separator 6, between each of the successive stages. The apparatus may also comprise a heat exchanger 39, a column still 37 and a condenser 38.

In carrying out the invention in the apparatus illustrated for example, sodium bicarbonate and calcium sulphate are introduced in the mixers 1 and 2, respectively, into a stream of the aqueous reaction medium supplied through connection 14 and introduced into the reaction vessel 3 through connection 15. Any carbon dioxide liberated in the mixer 2 may be discharged through connection 31 and separately recovered or discharged through connection 33 by means of connections 31 and 32, respectively, and recovered with carbon dioxide liberated from the reaction vessel 3. In the reaction vessel 3, the reaction is completed at a temperature approximating 40°–60° C., for example, the liberated carbon dioxide being discharged through connection 33. This liberated carbon dioxide may be discharged from the reaction vessel 3 under pressure if desired. The reaction mixture flows from the reaction vessel 3 to the filter 4 through connection 16. After separation of calcium carbonate, the reaction liquor is discharged to storage vessel 11 through connection 17. The separated calcium carbonate is washed with water, at a temperature approximating 50°–60° C., for example, supplied from vessel 9 through connection 18 and the washed calcium carbonate is discharged through connection 19. The wash liquor is discharged through connection 20 to the storage vessel 10. Sodium sulphate is precipitated by concentration, in evaporator 5, of liquor supplied from storage vessel 11 through connections 21 and 22. The concentrated liquor including precipitated sodium sulphate is discharged from the evaporator 5 to separator 6 through connection 23, the concentrated slurry being discharged from the separator 6 to centrifuge 7 through connection 24, the remaining concentrated liquor being discharged from the separator 6 through connection 25 or through connections 25 and 26. A further separation of liquor from the precipitated sodium sulphate is effected in the centrifuge 7, the separated liquor being returned to the evaporator 5 through connections 27 and 26 and the sodium sulphate being discharged through connection 28.

In the operation of the invention condensate from the steam chest of evaporator 5 may be discharged through connection 34 to vessel 9 and advantageously used as the hot wash water for separated calcium carbonate. Vapors from evaporator 5 condensed in condensing column 8 may be passed to tank 29 and any ammonia or other gases present in the condensate recovered. Further, low pressure steam from one of the evaporating pans may be used to supply heat to promote the reaction in the vessel 3. This steam may be supplied, for example, through connection 30 to a heat exchanger 35 arranged in reaction vessel 3 or in any other suitable manner. This feature of the invention is advantageous in that it conserves steam, thereby promoting economy of operation. The liquor from vessel 11 may be supplied directly to evaporator 5, through connection 40, or it may be passed through column still 37 on its way to evaporator 5. In the column still 37, any ammonia and a large part of any free carbon dioxide present are stripped from the liquor, the distillation being effected by steam supplied through connection 41, the distillate being recovered in condenser 38 discharging into any appropriate receiver, tank 29 for example. When such stripping is so effected, the liquor is with advantage preheated, in heat exchanger 39 for example, to minimize any dilution resulting from condensation of steam in still 37 tending to increase the burden on the evaporator 5. Steam or hot condensate from the steam chest of evaporator 5, for example, may be used as the heating medium in heat exchanger 39. This feature of the invention is advantageous in that it facilitates the use of a barometric condenser as the condenser 8.

In accordance with this invention, concentrated liquor separated from the precipitated sodium sulphate, in the separator 6 in the apparatus illustrated, is returned, through connection 25 in the apparatus illustrated, to the reaction vessel, and wash liquor from the storage vessel 10 is used as the aqueous medium, supplied through connection 14 in the apparatus illustrated, in which the sodium bicarbonate and calcium sulphate are introduced into the reaction vessel.

The following example will further illustrate a continuous operation embodying the invention using apparatus of the general arrangement illustrated, in which proportions are given in the form of rates, parts by weight per unit of time:

About 278 parts of crude ammonia soda, containing about 85% $NaHCO_3$, and about 213 parts of anhydrite, containing about 90% available $CaSO_4$, both in a fine state of subdivision, are introduced into the reaction vessel in 210 parts of recirculated mother liquor containing 50 parts $Na_2SO_4$, 8 parts $Na_2CO_3$, 8 parts $NaCl$, together with 550 parts of weak wash liquor containing 50 parts $Na_2SO_4$, 2 parts $Na_2CO_3$, 2 parts $NaCl$, and with minor quantities of $NH_3$ and $CO_2$. In the reaction vessel the reaction is completed at a temperature of about 55° C. About 52 parts of carbon dioxide are liberated in the reaction vessel and about 5 parts in the filter. After separation of calcium carbonate, about 852 parts of liquor including about 249 parts $Na_2SO_4$, 9 parts $Na_2CO_3$, 9 parts $NaCl$ are discharged from the filter to the evaporator. The initially separated calcium carbonate is washed with about 455 parts of hot water to form the 550 parts, approximately, of weak wash liquor which is part of the aqueous medium in which the reactants are supplied to the reaction vessel. After this washing the separated calcium carbonate amounts to about 161 parts (dry basis) including about one part of soluble salts. After evaporation of about 427 parts of water in the evaporator, over a temperature range approximating 77°–101° C., about 197 parts of sodium sulphate, as $Na_2SO_4$, contaminated with about 12 parts of the concentrated liquor containing 3 parts $Na_2SO_4$, 0.5 part $Na_2CO_3$, 0.5 part NaCl, are recovered as the primary sodium sulphate product. About 210 parts of the concentrated liquor from which this sodium sulphate is separated, including about 50 parts of sodium sulphate, 8.0 parts of sodium chloride and 8.0 parts of sodium carbonate are returned to the reaction vessel. Concentrated liquor separated from the sodium sulphate product in excess of this proportion is returned to the evaporator. The primary sodium sulphate product is dried to produce a final product containing 99.5% $Na_2SO_4$ or better.

With the added step of returning concentrated liquor from which sodium sulphate has been separated following concentration of the reaction mixture after separation of precipitated calcium carbonate, as described herein, the reaction between sodium bicarbonate and calcium sulphate is with advantage carried out as described in an application filed January 5, 1934, Serial Number 705,332.

I claim:

1. In the manufacture of sodium sulphate by reaction between sodium bicarbonate and calcium sulphate in an aqueous medium, the improvement which comprises introducing the sodium bicarbonate and calcium sulphate into a reaction vessel in an aqueous reaction medium, separating precipitated calcium carbonate from the reaction mixture discharged from the reaction vessel, washing the separated calcium carbonate with water to form the aqueous medium in which the sodium bicarbonate and calcium sulphate are introduced into the reaction vessel, concentrating the reaction mixture by evaporation after separation of calcium carbonate to precipitate sodium sulphate, said evaporation being limited to prevent substantial precipitation of sodium carbonate, separating precipitated sodium sulphate from the concentrated liquor and returning concentrated liquor after separation of precipitated sodium sulphate to the reaction vessel.

2. In the manufacture of sodium sulphate by reaction between sodium bicarbonate and calcium sulphate in an aqueous medium, the improvement which comprises introducing sodium bicarbonate and calcium sulphate into a reaction vessel in an aqueous medium, separating precipitated calcium carbonate from the reaction mixture discharged from the reaction vessel, concentrating the reaction mixture by evaporation after separation of precipitated calcium carbonate to precipitate sodium sulphate, said evaporation being limited to prevent substantial precipitation of sodium carbonate and separating the precipitated sodium sulphate from the concentrated liquor, and returning the concentrated liquor after separation of sodium sulphate to the reaction vessel, the amount of sodium bicarbonate introduced being not substantially in excess of the molecular equivalent of the introduced calcium sulphate.

ROBERT BURNS MACMULLIN.